United States Patent
Tsai et al.

(10) Patent No.: US 9,242,421 B2
(45) Date of Patent: Jan. 26, 2016

(54) METHOD FOR MANUFACTURING CARBON FIBER RIM

(71) Applicant: TIEN HSIN INDUSTRIES CO., LTD., Taichung (TW)

(72) Inventors: Vince Tsai, Taichung (TW); Meng Hua Chiang, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 211 days.

(21) Appl. No.: 14/048,566

(22) Filed: Oct. 8, 2013

(65) Prior Publication Data

US 2015/0096672 A1    Apr. 9, 2015

(51) Int. Cl.

| | |
|---|---|
| B29C 70/74 | (2006.01) |
| B60B 21/08 | (2006.01) |
| B29D 99/00 | (2010.01) |
| B29C 70/54 | (2006.01) |
| B60B 5/02 | (2006.01) |
| B29C 70/00 | (2006.01) |
| B29L 31/32 | (2006.01) |
| B29K 101/10 | (2006.01) |
| B29K 307/04 | (2006.01) |
| B29L 31/30 | (2006.01) |
| B29L 31/00 | (2006.01) |

(52) U.S. Cl.
CPC ........... *B29D 99/0032* (2013.01); *B29C 70/00* (2013.01); *B29C 70/545* (2013.01); *B29C 70/747* (2013.01); *B60B 5/02* (2013.01); *B60B 21/08* (2013.01); *B29K 2101/10* (2013.01); *B29K 2307/04* (2013.01); *B29L 2031/3091* (2013.01); *B29L 2031/32* (2013.01); *B29L 2031/322* (2013.01); *B29L 2031/7482* (2013.01); *B60B 2310/204* (2013.01); *B60B 2360/368* (2013.01)

(58) Field of Classification Search
CPC .. B29D 99/0032; B29C 70/30; B29C 70/545; B29C 70/747; B29L 2031/3091; B29L 2031/322; B60B 5/02; B60B 21/08; B60B 2310/202; B60B 2310/204; B60B 2360/368
See application file for complete search history.

(56) References Cited

U.S. PATENT DOCUMENTS

| | | | | |
|---|---|---|---|---|
| 3,433,327 | A * | 3/1969 | Regis | 188/24.13 |
| 4,030,754 | A * | 6/1977 | Merlette | 301/95.103 |
| 6,120,105 | A * | 9/2000 | Chern | 301/95.104 |
| 2004/0090110 | A1* | 5/2004 | Bernardi | 301/95.101 |
| 2006/0197369 | A1* | 9/2006 | Chiu et al. | 301/6.3 |
| 2006/0267397 | A1* | 11/2006 | Possarnig et al. | 301/95.102 |

(Continued)

FOREIGN PATENT DOCUMENTS

| | | | |
|---|---|---|---|
| DE | 102009038459 B3 | * | 3/2011 |
| EP | 2524817 A1 | * | 11/2012 |
| EP | 2765009 A1 | * | 8/2014 |

(Continued)

*Primary Examiner* — William Bell
(74) *Attorney, Agent, or Firm* — WPAT, PC; Justin King (57) ABSTRACT

A method for manufacturing a carbon fiber rim is disclosed, which includes: preparing a carbon fiber composite material and a thermosetting resin-based composite material; preparing a mold to place the carbon fiber composite material into the mold so that the carbon fiber composite material forms a pre-molded rim according to the shape of the mold, and then annularly affixing the thermosetting resin-based composite material respectively to brake surfaces on both sides of the pre-molded rim, so as to form a brake layer; placing the pre-molded rim into the mold to integrally form a rim by means of heat and pressure; and taking out the rim having the brake layer on the surface.

19 Claims, 8 Drawing Sheets

(56) References Cited

U.S. PATENT DOCUMENTS

| | | | |
|---|---|---|---|
| 2007/0102992 A1* | 5/2007 | Jager | 301/30 |
| 2008/0265657 A1* | 10/2008 | Reuteler | 301/95.101 |
| 2009/0250995 A1* | 10/2009 | Tsai | 301/95.108 |
| 2014/0015307 A1* | 1/2014 | Poertner et al. | 301/6.9 |
| 2014/0117745 A1* | 5/2014 | Wilke et al. | 301/6.9 |
| 2014/0167384 A1* | 6/2014 | Chuang | 280/281.1 |

FOREIGN PATENT DOCUMENTS

| | | | | |
|---|---|---|---|---|
| GB | 2423752 A | * | 9/2006 | |
| JP | 07329198 A | * | 12/1995 | B29C 70/10 |
| TW | M389648 | | 10/2010 | |

* cited by examiner

FIG. 8

METHOD FOR MANUFACTURING CARBON FIBER RIM

BACKGROUND OF THE INVENTION

1. Field of Invention

The present invention relates to a method for manufacturing a carbon fiber rim, and in particular, to a method for manufacturing a carbon fiber rim with a brake layer formed by a thermosetting resin-based composite material.

2. Related Art

Figure 1:
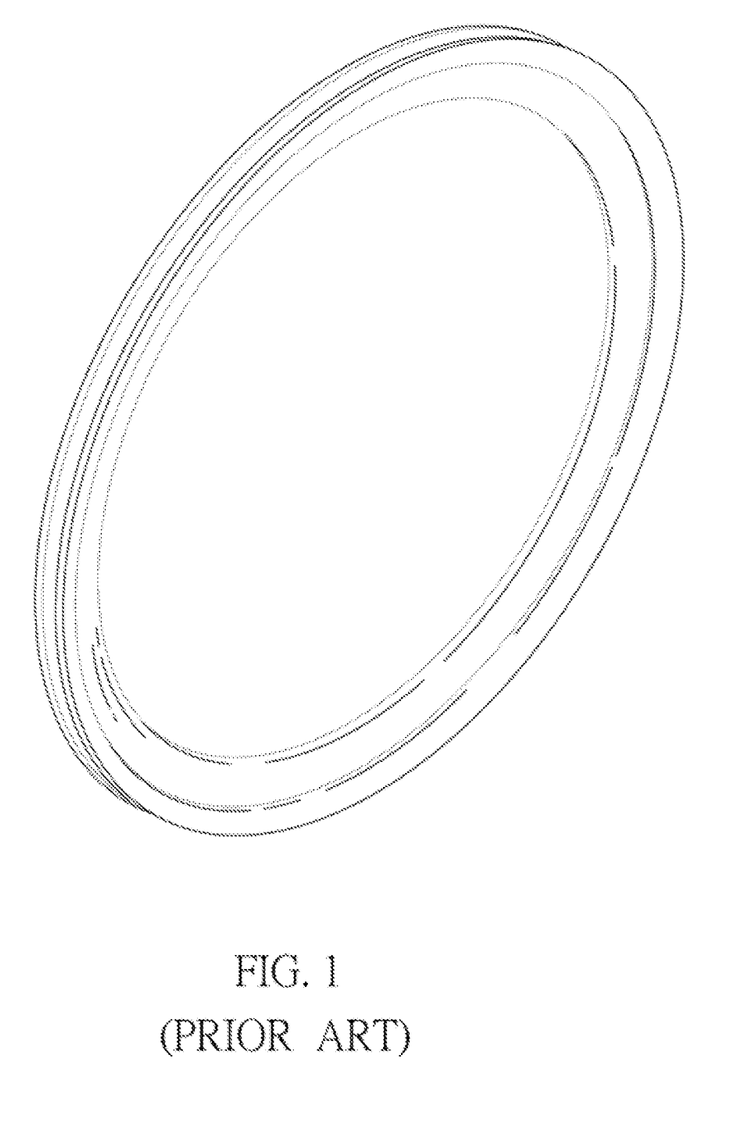
FIG. 1 is a schematic diagram of appearance of the conventional bicycle rim.

Bicycles on the market generally use two types of brake, i.e., caliper brake and disc brake. The bicycle brake system using the caliper brake is widely used because of its simple structure, light weight and low price; moreover, as the bicycle tends to be light-weighted in recent years, the traditional aluminum alloy material has been gradually replaced by a carbon fiber composite material, which is widely used because in addition to the advantage of light weight, the carbon fiber composite material has high strength and good shock absorption. However, as shown in FIG. 1, the carbon fiber bicycle rim not only needs to support the cyclist's weight and the bicycle's weight, but also needs to load up-to-down impact and left-to-right torsion brought about by various road conditions. When the bicycle travels along a long continuous steep downhill section, a decelerating or stopping effect is achieved by friction between the brake block and the rim. However, as it is difficult for the rim made of the carbon fiber composite material to dissipate heat, the rim continuously contacts and rubs against the brake block to generate heat during the braking, and relatively, heat may be accumulated on the rim, which may result in that the rim is easy to be scratched, cracked or deformed, or even cause the danger of rim breakage or brake failure when the heat cannot be dissipated rapidly.

To solve the above problem, the industry takes the following processing measures.

Figure 2:
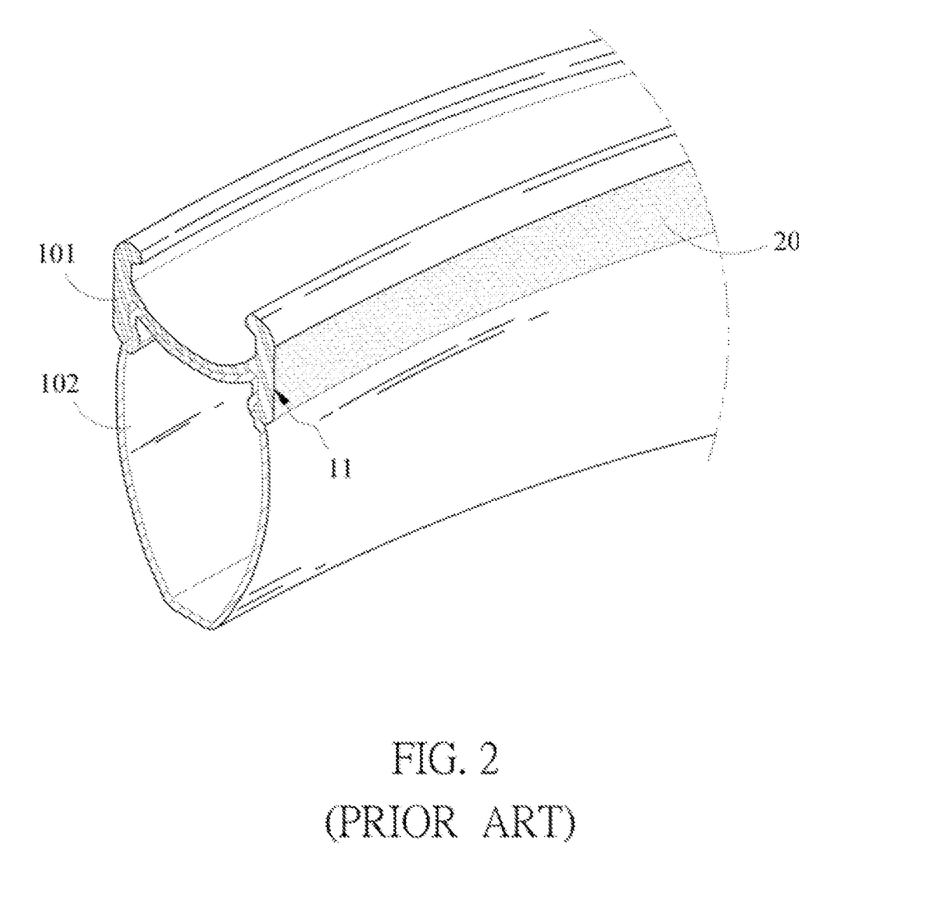
FIG. 2 is a schematic cross-sectional diagram of Taiwan Publication No. M389648 "BICYCLE COMPOSITE MATERIAL RIM HAVING PROTECTIVE COATING;"

For example, in Taiwan Publication No. M389648 "BICYCLE COMPOSITE MATERIAL RIM HAVING PROTECTIVE COATING," as shown in FIG. 2, the rim includes a metal frame 101 and a carbon fiber frame 102, two sides of the metal frame 101 each have a braking section 11 for contacting the brake block (not shown) of the bicycle brake system to generate friction, so as to make the moving bicycle slow down or stop. The braking section 11 forms a protective coating 20 by spraying metal powder to the surface of the braking section 11 with a spray process, thereby replacing the braking section 11 with the protective coating 20 to contact the brake block of the bicycle.

However, as the cost of the metal spray coating method is too high, the price of the bicycle does not have market competitiveness correspondingly, and the bicycle rim further includes a metal frame portion, which substantially has not been capable of thoroughly achieving the lightweight aim as compared with the rim completely made of the carbon fiber composite material.

Also, surface plating is applied to the braking section of the bicycle rim, so that the surface of the braking section has a plated metal layer, thereby achieving the decelerating or brake effect with the surface of the plated metal layer contacting and rubbing against the brake block of the bicycle. However, after the manner of being attached to the surface of the rim by means of metal coating has been used for a considerable time, the metal coating may peel off, and a lot of time or money needs to be spent on the maintenance and repair, which is not beneficial to the cost.

SUMMARY OF THE INVENTION

The main objective of the present invention is to provide a method for manufacturing a carbon fiber rim having a long service life and a high safety sliding-stop deceleration and brake effect through coating a thermosetting resin-based composite material on the brake layer of the rim with roughened surface treatment.

The present invention has the following advantages described below:

Firstly, in the present invention, the rim is provided with a brake layer for contact with a bicycle brake at both sides respectively, wherein the brake layer is a composite material using epoxy resin as a substrate, and after the brake layer is roughened, it not only can resist abrasion, prolong the service life and enhance friction, but also can make the decelerating or brake effect more effectively.

Secondly, because the brake layer according to the present invention can withstand a high temperature and dissipate heat rapidly, and heat is not easy to be transferred to the rim of the carbon fiber composite material; thus, it can avoid that, when the bicycle travels along a long continuous downhill road, the rim's temperature increases due to the braking friction, the rim is easy to be scratched, cracked or deformed, or even the danger of rim breakage or brake failure is rendered.

Finally, the process according to the present invention can reduce the manufacture cost as compared with the conventional metal spraying method, and has the advantages of not being easy to peel off and prolonging the service life as compared with the conventional surface plating method, so that the bicycle is of cheap price, can be widely used by consumers, and has market competition.

DETAILED DESCRIPTION OF THE INVENTION

Detailed content and technology about the present invention are further described below with embodiments, but it should be understood that the embodiments are only exemplary and should not be construed as limitations to implementation of the present invention.

Figure 3:
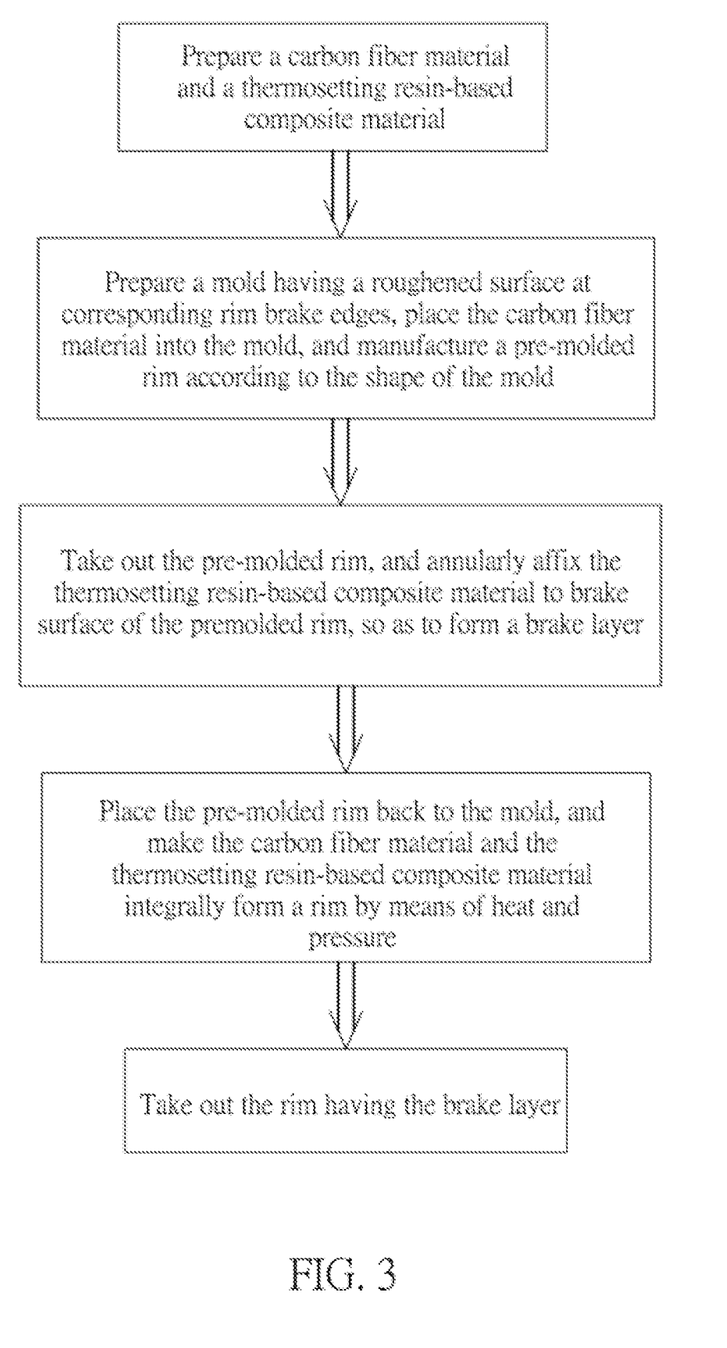
FIG. 3 is a flowchart of a first embodiment of the present invention.

Referring to FIGS. 3, 4, 5A and 5B, the first embodiment of the method for manufacturing a carbon fiber rim according to the present invention is as shown in FIG. 3.

At first, prepare a carbon fiber composite material and a thermosetting resin-based composite material. Next, prepare a rim-shaped mold for providing molding of the carbon fiber rim, and then place the carbon fiber composite material into the mold so that the carbon fiber composite material is distributed to form a pre-molded rim according to the mold. After the pre-molded rim is manufactured, take out the pre-molded rim from the mold, and then annularly affix the thermosetting resin-based composite material respectively to brake surfaces on both sides of the pre-molded rim, so as to form a brake layer 31.

Place the pre-molded rim back to the mold again and make the pre-molded rim and the thermosetting resin-based composite material integrally form a rim 30 by means of heat and pressure.

Figure 4:
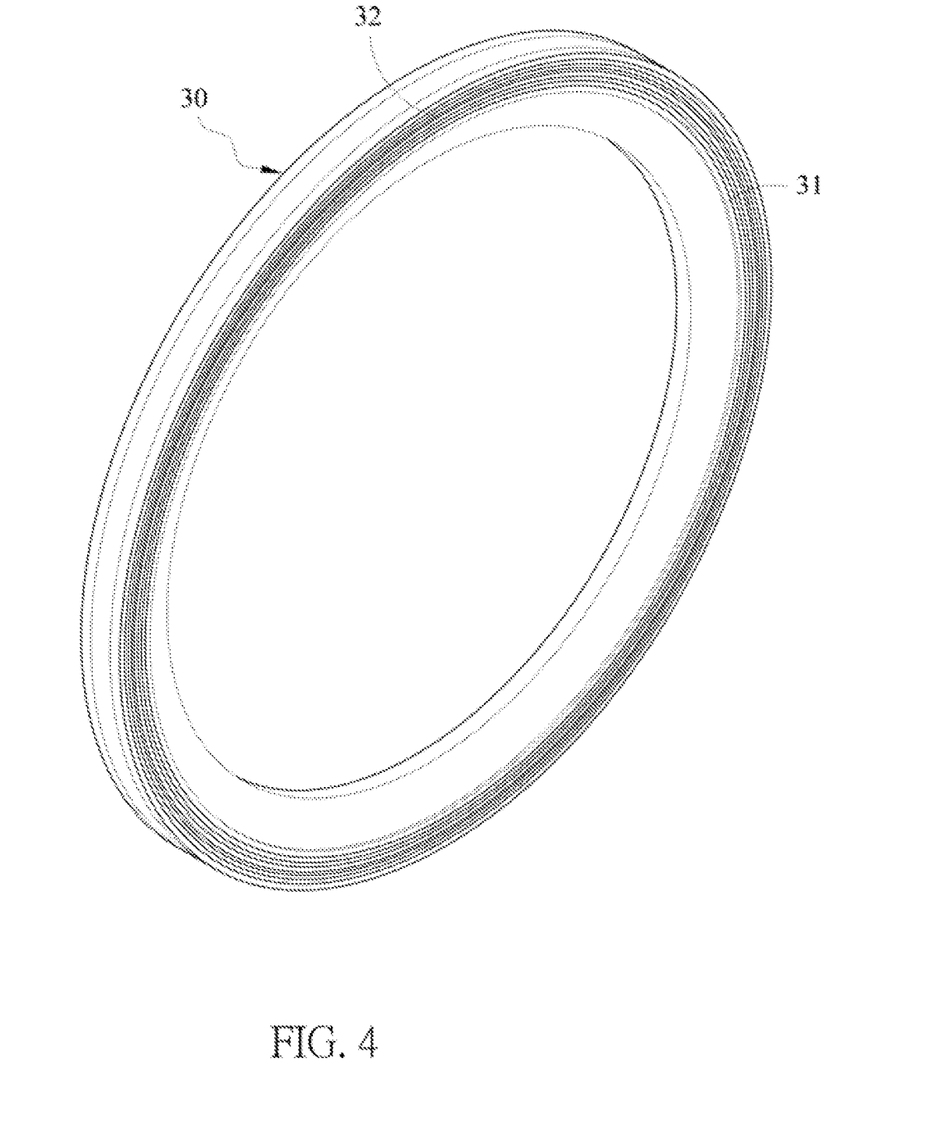
FIG. 4 is a three-dimensional diagram of rims manufactured according to the present invention.

Take out the rim 30 having the brake layer 31 respectively on both sides of the surface, and the carbon fiber rim of the present invention are accomplished, which is as shown in FIG. 4.

It should be particularly noted that, a roughened surface is formed on the surface of the mold in contact with the brake layer 31, the roughened surface is used to perform surface roughening treatment at the brake layer 31, and the roughened surface herein may be a misted surface after industrial blasting treatment or surface treatment is performed by mechanical means such as tools and machines so that the surface has an uneven appearance.

Figure 5A:
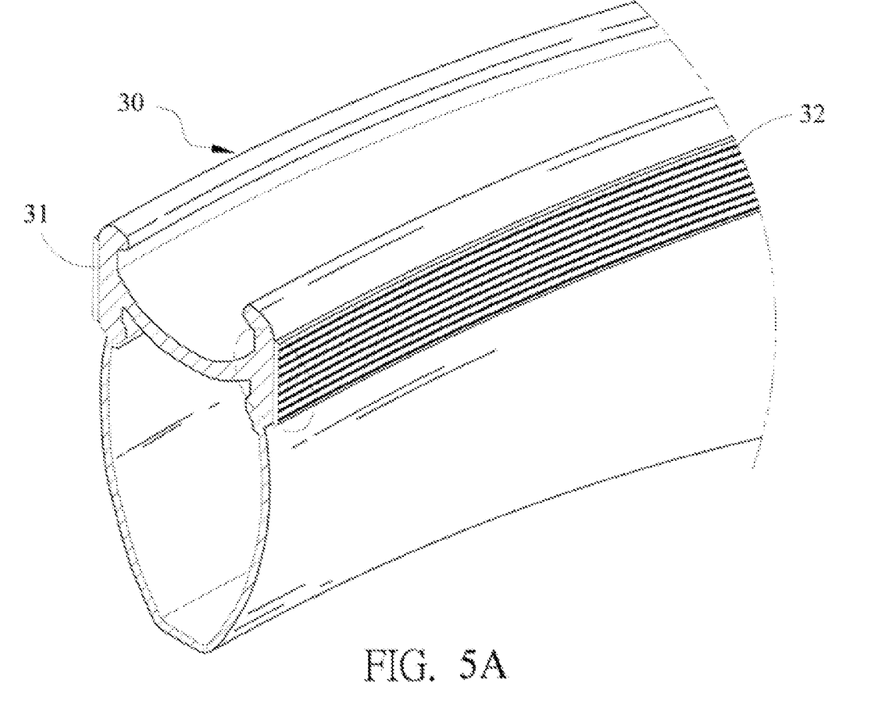
FIG. 5A is a schematic cross-sectional diagram of the rims manufactured according to the present invention.
Figure 5B:
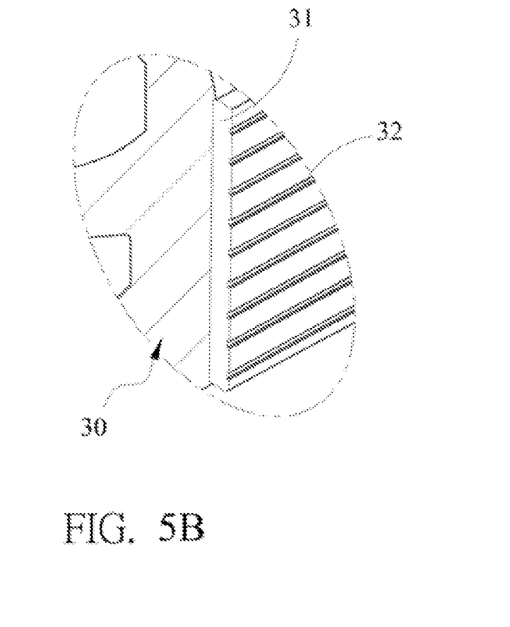
FIG. 5B is an enlarged diagram of a part in FIG. 5A.

In addition, in this embodiment, the roughened surface is a plurality of annular patterns 32 concentric with the rim 30, which is as shown in FIGS. 5A and 5B; certainly, the patterns according to the embodiments of the present invention are not limited to annular, for example, swirling, wavy, continuous patterns, non-continuous patterns, and the like are design variations of the patterns of the present invention, which is not repeated hereinafter.

Figure 6:
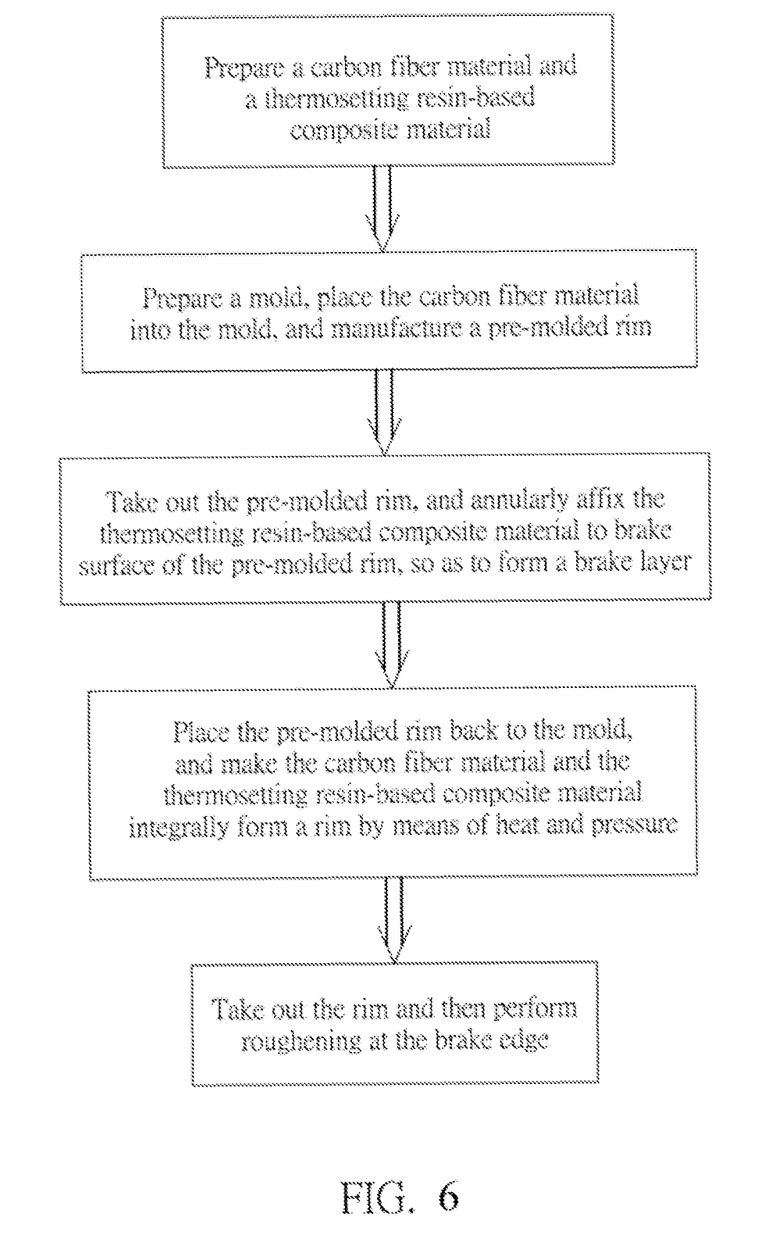
FIG. 6 is a flowchart of a second embodiment of the present invention.

FIG. 6 shows a second embodiment of the method for manufacturing a carbon fiber rim according to the present invention, the process of manufacturing the rim 30 thereof is substantially the same as that of the first embodiment, and the difference lies in that in this embodiment, a roughened surface is not formed on the portion of the mold in contact with the brake layer 31 which is available for molding of the rim, instead, roughening treatment is directly performed on the brake layer 31 by means of machining after the rim 30 is formed and taken out from the mold.

Figure 7:
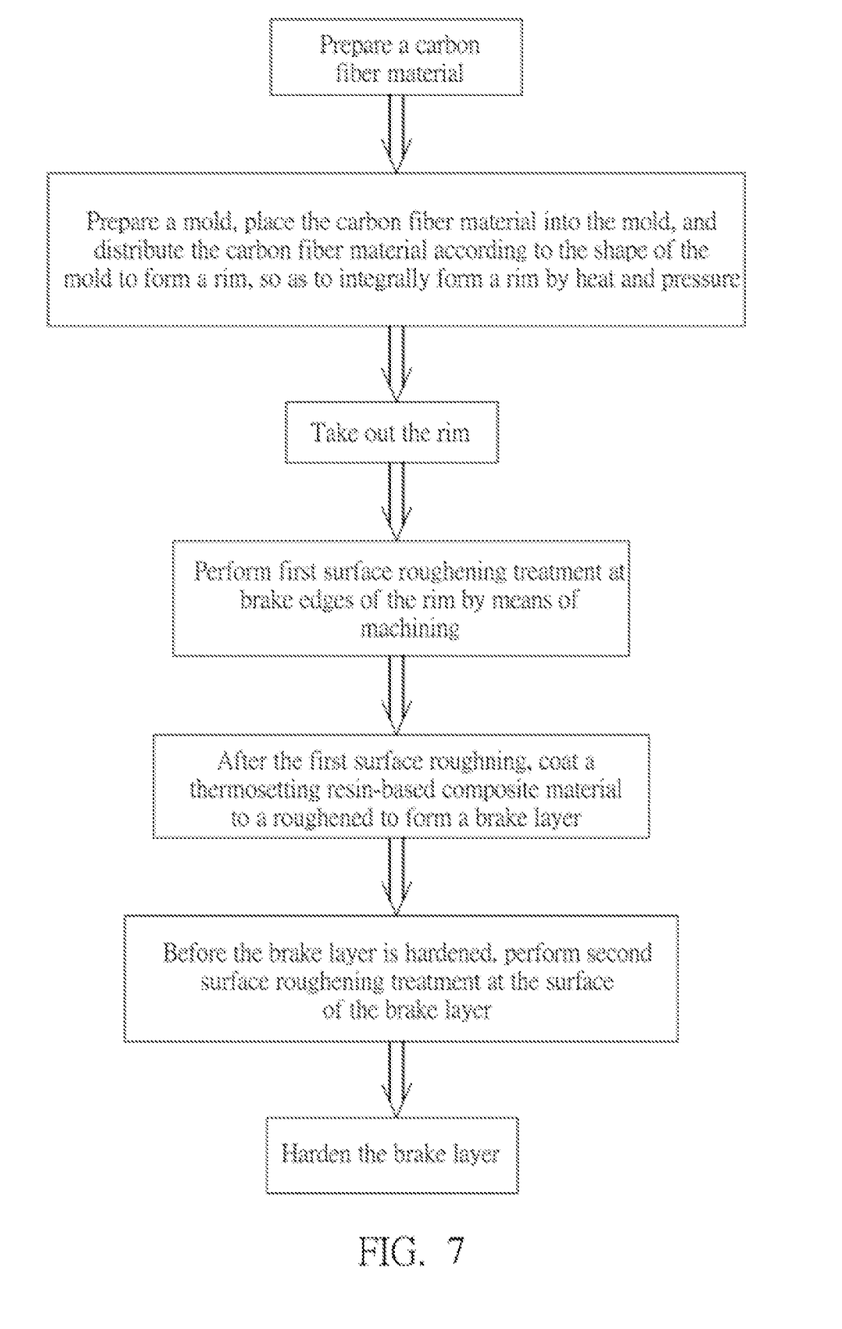
FIG. 7 is a flowchart of a third embodiment of the present invention.

FIG. 7 is a flowchart of a third embodiment of the method for manufacturing a carbon fiber rim according to the present invention.

As shown in FIG. 7, at first, prepare a carbon fiber composite material. Next, prepare a rim-shaped mold for providing molding of the carbon fiber rim, place the carbon fiber composite material into the mold, make the carbon fiber composite material integrally form a rim 30 by means of heat and pressure, and then take out the rim 30.

Afterwards, perform first surface roughening treatment at the position of the brake layer 31 on both sides of the rim 30 by means of machining, and such a machining manner may be industrial blasting treatment or surface treatment is performed by mechanical means such as tools and machines so that the surface has an uneven appearance. After the first surface roughening treatment, coat a thermosetting resin-based composite material to the roughened surface so as to form a brake layer 31.

Before the brake layer 31 is hardened, second surface roughening treatment is performed on the surface of the brake layer 31, and the brake layer 31 is hardened upon completion of the roughening treatment. In this embodiment, the second surface roughening of the brake layer 31 is manufacturing a plurality of annular patterns 32 concentric with the rim 30 on the surface of the brake layer 31 by mechanical means such as tools and machines.

Figure 8:
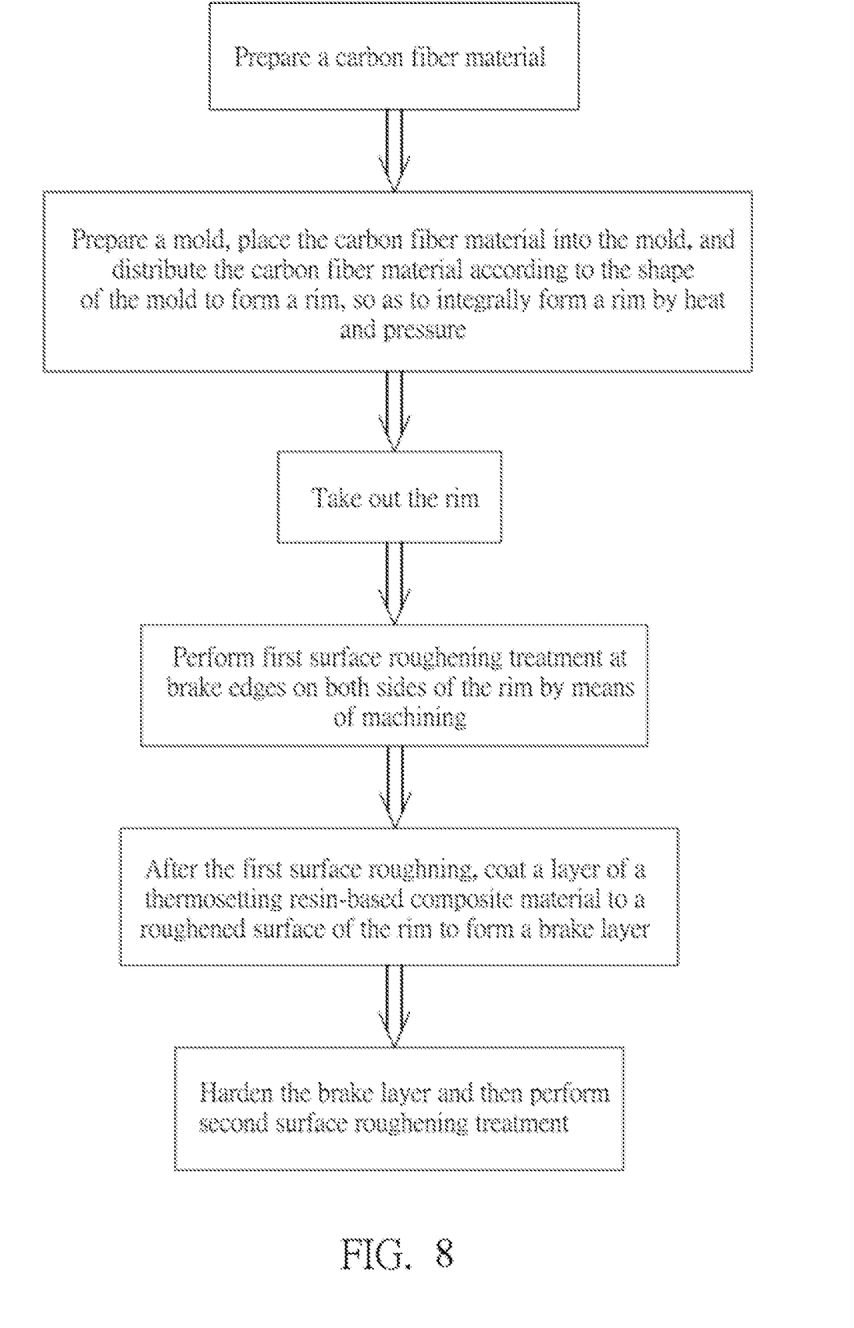
FIG. 8 is a flowchart of a fourth embodiment of the present invention.

FIG. 8 is a flowchart of a fourth embodiment of the method for manufacturing a carbon fiber rim according to the present invention.

As shown in FIG. 8, at first, prepare a carbon fiber composite material. Next, prepare a rim-shaped mold for providing molding of the carbon fiber rim, place the carbon fiber composite material into the mold, make the carbon fiber composite material integrally form a rim 30 by means of heat and pressure, and then take out the rim 30.

Afterwards, perform first surface roughening treatment at brake surface positions on both sides of the rim 30 by means of machining, and such a machining manner may be industrial blasting treatment or surface treatment is performed by mechanical means such as tools and machines so that the surface has an uneven appearance.

After the first surface roughening treatment, coat a thermosetting resin-based composite material to a roughened surface of the rim 30 so as to form a brake layer 31.

After the brake layer 31 is hardened, second surface roughening treatment is performed on the surface of the brake layer 31 by means of machining. In this embodiment, the second surface roughening of the brake layer 31 is manufacturing a plurality of annular patterns 32 concentric with the rim on the surface of the brake layer 31 by mechanical means such as tools and machines.

It should be noted that the thermosetting resin used in the embodiments of the method for manufacturing a carbon fiber rim according to the present invention may be epoxy resin or polyester resin or acrylic resin.

In this way, the brake layer not only can resist abrasion and prolong the service life, but also can achieve a better decelerating or brake effect, which especially can avoid that, when the bicycle travels along a long continuous downhill road, the temperature increases due to the brake friction so that the rim is easy to be scratched, cracked or deformed, thereby rendering the danger of rim breakage or brake failure.

It should be noted that, the process according to the present invention can significantly reduce the manufacture cost as compared with the conventional metal spraying method, and has the advantages of not being easy to peel off and prolonging the service life as compared with the conventional plating on the surface of the metal rim, so that the bicycle is of cheap price, can be widely used by consumers, and has market competition.

The above are merely preferred embodiments of the present invention, and the scope of implementation of the present invention cannot be limited accordingly. Simple equivalent variations and modifications made according to the claims and the content of the description of the present invention still fall within the scope of the invention patent.

What is claimed is:

1. A method for manufacturing a carbon fiber rim, comprising:
   preparing a carbon fiber composite material and a thermosetting resin-based composite material;
   preparing a mold for molding the carbon fiber rim, and first placing the carbon fiber composite material into the mold so that the carbon fiber composite material is distributed to form a pre-molded rim according to the shape of the mold;

taking out the pre-molded rim, and then affixing the thermosetting resin-based composite material respectively to brake surfaces on both sides of the pre-molded rim, so as to form a brake layer;

placing the pre-molded rim back to the mold, and making the pre-molded rim and the thermosetting resin-based composite material integrally form a rim by means of heat and pressure; and taking out the rim having the brake layer respectively on both sides of the surface.

2. The method for manufacturing a carbon fiber rim according to claim 1, wherein a roughened surface is formed on a portion of the surface of the mold in contact with the brake layer, and the roughened surface is used to perform surface roughening treatment at the brake layer.

3. The method for manufacturing a carbon fiber rim according to claim 2, wherein the roughened surface has a plurality of annular patterns.

4. The method for manufacturing a carbon fiber rim according to claim 3, wherein the plurality of annular patterns is concentrically distributed with the rim.

5. The method for manufacturing a carbon fiber rim according to claim 3, wherein sections of the annular patterns are grooves.

6. The method for manufacturing a carbon fiber rim according to claim 1, wherein a surface roughening treatment is performed on the surface of the brake layer by means of machining.

7. The method for manufacturing a carbon fiber rim according to claim 6, wherein a plurality of annular patterns are formed on the surface of the brake layer.

8. The method for manufacturing a carbon fiber rim according to claim 7, wherein sections of the annular patterns are grooves.

9. The method for manufacturing a carbon fiber rim according to claim 1, wherein the thermosetting resin is any one of epoxy resin, polyester resin, and acrylic resin.

10. A method for manufacturing a carbon fiber rim, comprising:

preparing a carbon fiber composite material;

preparing a mold for molding the carbon fiber rim, placing the carbon fiber composite material into the mold, and making the carbon fiber composite material integrally form a rim by means of heat and pressure;

taking out the rim;

performing first surface roughening treatment at brake surface positions on both sides of the rim by means of machining;

after the first surface roughening treatment, coating a thermosetting resin-based composite material to a roughened surface of the rim so as to form a brake layer;

before the brake layer is hardened, performing second surface roughening treatment on the surface of the brake layer; and hardening the brake layer.

11. The method for manufacturing a carbon fiber rim according to claim 10, wherein the second surface roughening treatment manufactures a plurality of annular patterns at the surface of the brake layer by means of machining.

12. The method for manufacturing a carbon fiber rim according to claim 11, wherein the plurality of annular patterns is concentrically distributed with the rim.

13. The method for manufacturing a carbon fiber rim according to claim 11, wherein sections of the annular patterns are grooves.

14. The method for manufacturing a carbon fiber rim according to claim 10, wherein the thermosetting resin is any one of epoxy resin, polyester resin, and acrylic resin.

15. A method for manufacturing a carbon fiber rim, comprising:

preparing a carbon fiber composite material;

preparing a mold for molding the carbon fiber rim, placing the carbon fiber composite material into the mold, and making the carbon fiber composite material integrally form a rim by means of heat and pressure;

taking out the rim;

performing first surface roughening treatment at brake bfeak surface positions on both sides of the rim by means of machining;

after the first surface roughening treatment, coating a thermosetting resin-based composite material to a roughened surface of the rim so as to form a brake layer; and hardening the brake layer, and then performing second surface roughening treatment at the surface of the brake layer.

16. The method for manufacturing a carbon fiber rim according to claim 15, wherein a plurality of annular patterns are manufactured at the surface of the brake layer by means of machining.

17. The method for manufacturing a carbon fiber rim according to claim 16, wherein the plurality of annular patterns is concentrically distributed with the rim.

18. The method for manufacturing a carbon fiber rim according to claim 16, wherein sections of the annular patterns are grooves.

19. The method for manufacturing a carbon fiber rim according to claim 15, wherein the thermosetting resin is any one of epoxy resin, polyester resin, and acrylic resin.

* * * * *